US008977637B2

(12) United States Patent
Asaad et al.

(10) Patent No.: US 8,977,637 B2
(45) Date of Patent: Mar. 10, 2015

(54) FACILITATING FIELD PROGRAMMABLE GATE ARRAY ACCELERATIONS OF DATABASE FUNCTIONS

(75) Inventors: Sameh Asaad, Briarcliff Manor, NY (US); Bernard V. Brezzo, Somers, NY (US); Donna N Eng Dillenberger, Yorktown Heights, NY (US); Parijat Dube, Hicksville, NY (US); Balakrishna Raghavendra Iyer, San Jose, CA (US); Hong Min, Poughkeepsie, NY (US); Bharat Sukhwani, Briarcliff Manor, NY (US); Mathew S. Thoennes, West Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 13/599,600

(22) Filed: Aug. 30, 2012

(65) Prior Publication Data
US 2014/0067845 A1   Mar. 6, 2014

(51) Int. Cl.
*G06F 17/30* (2006.01)
(52) U.S. Cl.
USPC ........................................................ 707/760
(58) Field of Classification Search
CPC .................... G06F 17/30427; G06F 17/30569; G06F 17/30442
USPC .......... 707/760, 761, 762, 763, 764, 765, 771
See application file for complete search history.

(56) References Cited

U.S. PATENT DOCUMENTS

| 7,353,162 | B2* | 4/2008 | Huang et al. ................... 703/23 |
| 7,433,863 | B2 | 10/2008 | Zane et al. |
| 7,698,338 | B2* | 4/2010 | Hinshaw et al. .............. 707/754 |
| 7,908,259 | B2* | 3/2011 | Branscome et al. .......... 707/705 |
| 7,966,343 | B2* | 6/2011 | Yang et al. .................... 707/791 |
| 8,171,018 | B2* | 5/2012 | Zane et al. .................... 707/718 |
| 8,458,129 | B2* | 6/2013 | Surlaker et al. ............... 707/625 |
| 2005/0028134 | A1 | 2/2005 | Zane et al. |
| 2009/0259644 | A1 | 10/2009 | Scheuermann |
| 2010/0306220 | A1 | 12/2010 | Sthanikam et al. |
| 2011/0246432 | A1* | 10/2011 | Yang et al. .................... 707/693 |

FOREIGN PATENT DOCUMENTS

| WO | 03100662 | 12/2003 |
| WO | 2009036987 | 3/2009 |

OTHER PUBLICATIONS

Altera, "FPGA Run-Time Reconfiguration: Two Approaches", Mar. 2008, White Paper ver. 1.0, pp. 1-6.*
Mueller, Rene, et al., "FPGA: What's in it for a Database?", SIGMOD'09, Jun. 29-Jul. 2, 2009, pp. 999-1004, ACM, Providence, Rhode Island, USA.

* cited by examiner

*Primary Examiner* — Rehana Perveen
*Assistant Examiner* — Loc Tran
(74) *Attorney, Agent, or Firm* — Ference & Associates LLC

(57) ABSTRACT

Methods and arrangements for facilitating accelerations of database functions. A field programmable gate array is incorporated. At least one query control block is incorporated in the field programmable gate array, and database management system operations are accelerated via the field programmable gate array. The accelerating includes employing the at least one query control block to execute a query without reconfiguring the field programmable gate array.

11 Claims, 7 Drawing Sheets

US 8,977,637 B2

FACILITATING FIELD PROGRAMMABLE GATE ARRAY ACCELERATIONS OF DATABASE FUNCTIONS

BACKGROUND

Recently, it has been recognized that using a field programmable gate array (FPGA) to offload and accelerate DBMS (database management system) operations can offer performance and cost benefits. Inasmuch as DBMS queries vary with respect to variations of queries in the workloads, reconfiguring FPGA (or reconfiguring an initial bit string load to FPGA) for each query can prove to be expensive.

BRIEF SUMMARY

In summary, one aspect of the invention provides a method comprising: incorporating a field programmable gate array; incorporating at least one query control block in the field programmable gate array; and accelerating database management system operations via the field programmable gate array; the accelerating comprising employing the at least one query control block to execute a query without reconfiguring the field programmable gate array.

Another aspect of the invention provides an apparatus comprising: at least one processor; and a computer readable storage medium having computer readable program code embodied therewith and executable by the at least one processor, the computer readable program code comprising: computer readable program code configured to incorporate a field programmable gate array; computer readable program code configured to incorporate at least one query control block in the field programmable gate array; computer readable program code configured to accelerate database management system operations via the field programmable gate array; and computer readable program code configured to perform the accelerating via employing the at least one query control block to execute a query without reconfiguring the field programmable gate array.

An additional aspect of the invention provides a computer program product comprising: a computer readable storage medium having computer readable program code embodied therewith, the computer readable program code comprising: computer readable program code configured to incorporate a field programmable gate array; computer readable program code configured to incorporate at least one query control block in the field programmable gate array; computer readable program code configured to accelerate database management system operations via the field programmable gate array; and computer readable program code configured to perform the accelerating via employing the at least one query control block to execute a query without reconfiguring the field programmable gate array.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
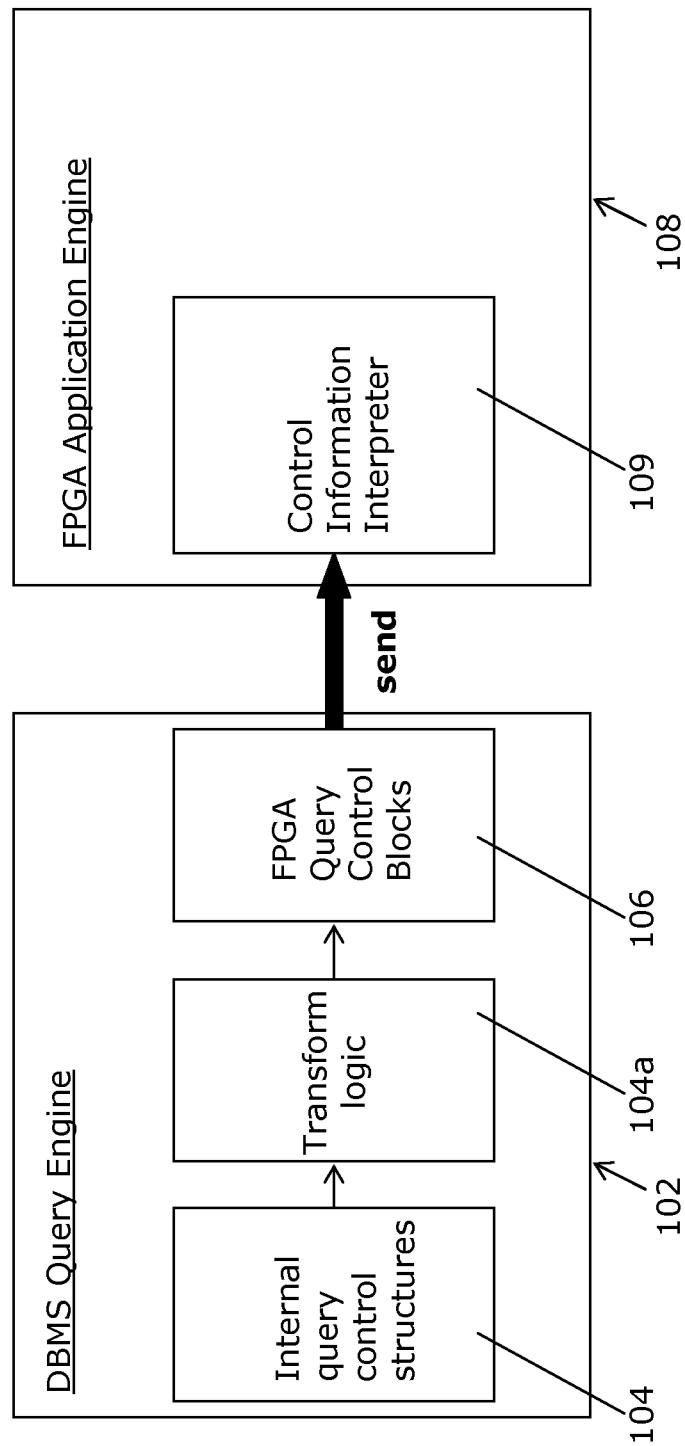
FIG. 1 schematically illustrates a system and constituent components.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 7, whether on a server computer, a client computer, a node computer in a distributed network, or any combination thereof.

Figure 3:
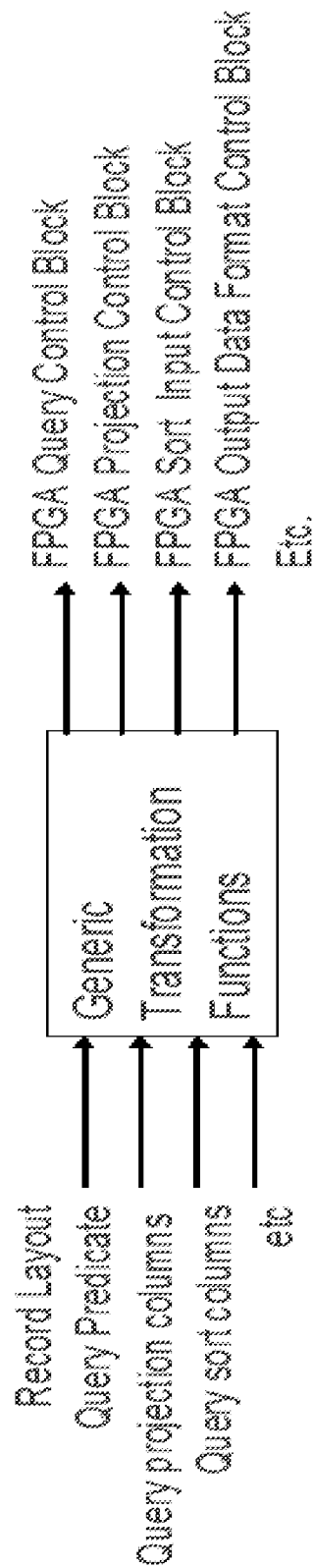
FIG. 3 schematically illustrates a manner of transforming a DBMS query to FPGA control information using software programs.
Figure 4:
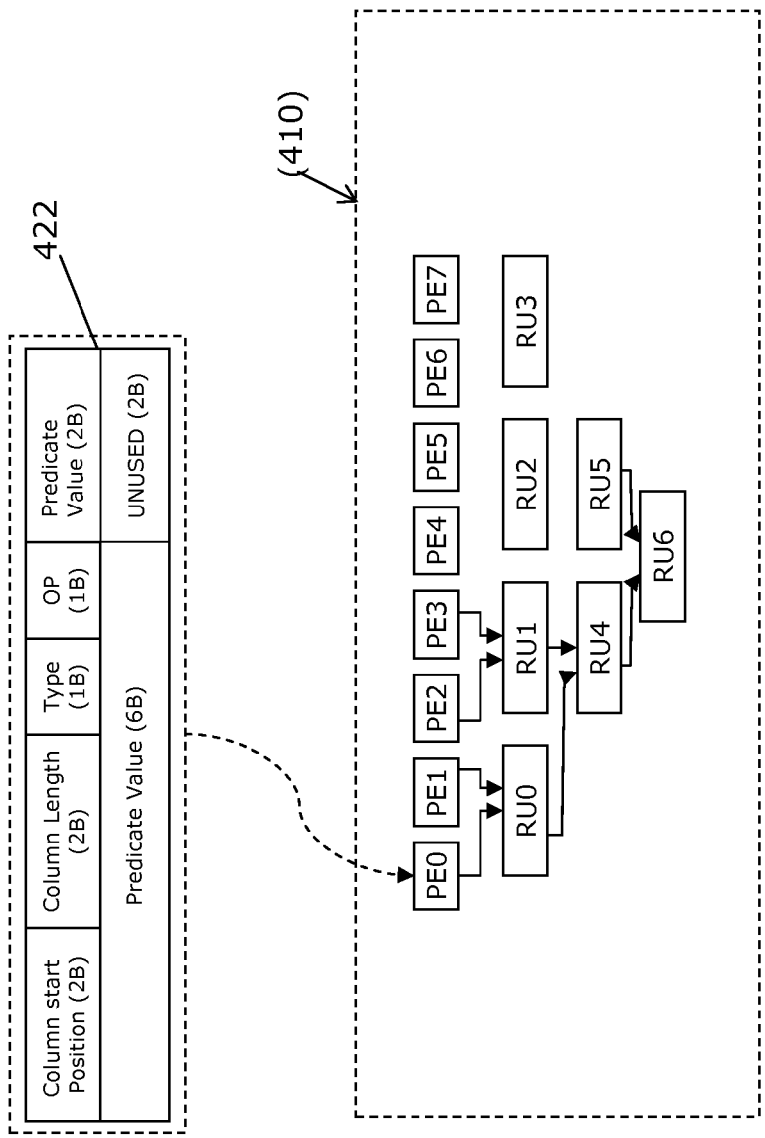
FIG. 4 schematically illustrates action taken by an FPGA control information interpreter.
Figure 5:
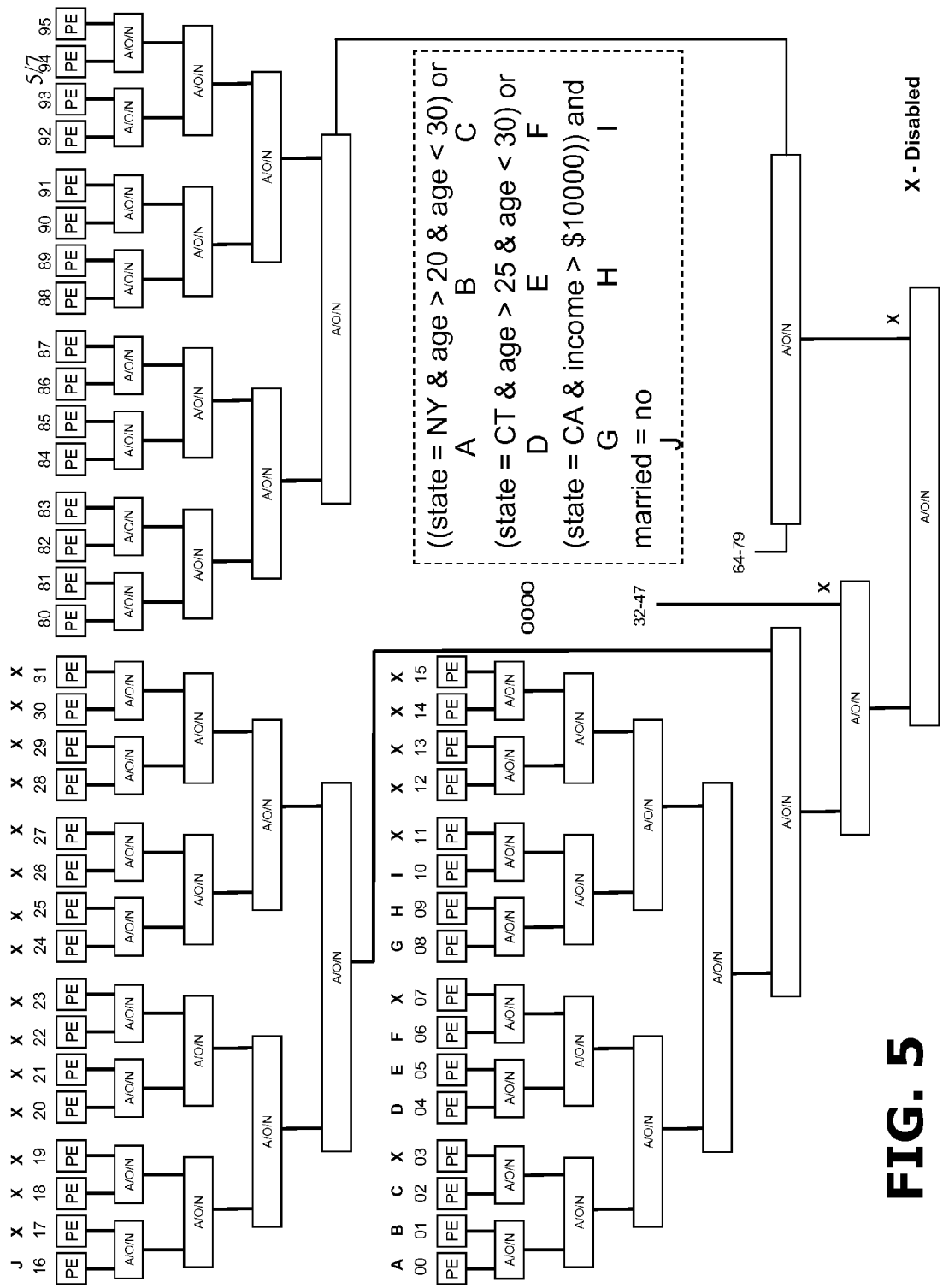
FIG. 5 schematically sets forth a working example.

To facilitate easier reference, in advancing from FIG. 1 to and through FIG. 5, a reference numeral is advanced by a multiple of 100 in indicating a substantially similar or analogous component or element with respect to at least one component or element found in at least one earlier figure among FIGS. 1-5.

Broadly contemplated herein, in accordance with at least one embodiment of the invention, are methods and systems that facilitate or promote an FPGA acceleration of DBMS operations without a need for reconfiguration, which itself facilitates or promotes a quick turnaround of multiple queries in the same execution environment.

More particularly, there is broadly contemplated herein, in accordance with at least one embodiment of the invention, a FPGA-based acceleration engine for database operations of analytics queries. A mechanism is provided whereby a DBMS can seamlessly harness FPGA computing power without requiring any changes in the application or the existing data layout. Using a software-programmed query control block, the FPGA accelerator can be tailored to execute different queries without FPGA reconfiguration.

FIG. 1 schematically illustrates a system and constituent components, in accordance with at least one embodiment of the invention. A DBMS query engine 102 is provided and includes an FPGA query control block (or blocks) 106 which encapsulates FPGA application requirements, and which can be interpreted by an acceleration engine (shown here as application engine 108) on the FPGA for flexible execution. An internal query transformation structure 104 is also provided, while transformation logic 104a transforms existing query control information into a control template. The control template, once processed by query control blocks 106, is sent to FGPA application engine 108 and a control information interpreter 109, which itself includes FPGA programming logic for interpreting the control template and executing a requirement function on input data.

Figure 2:
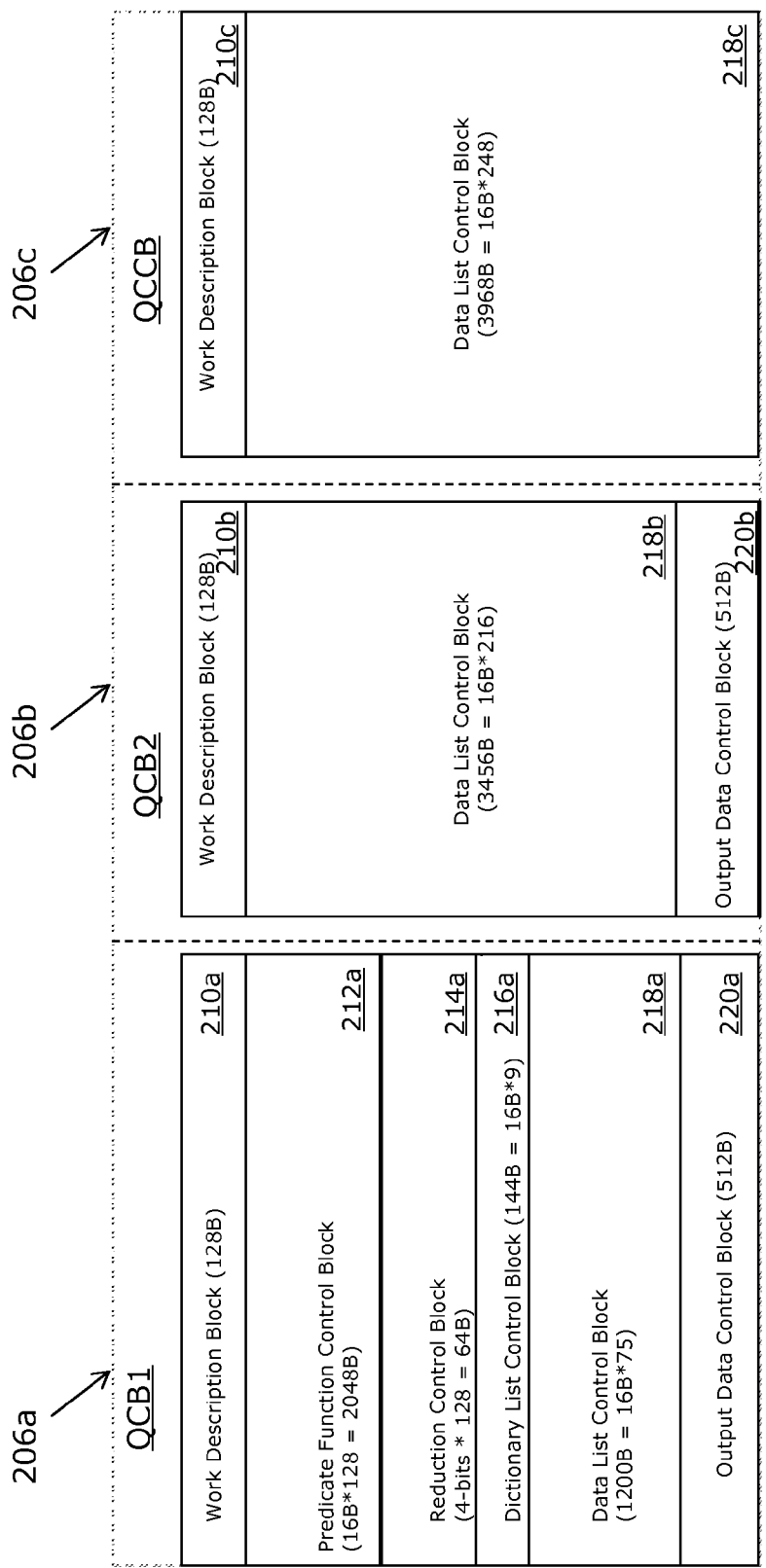
FIG. 2 schematically illustrates different types of query control blocks that may be employed.

FIG. 2 schematically illustrates different types of query control blocks that may be employed in accordance with at least one embodiment of the invention. They may be used in conjunction with one another in an environment, e.g., as shown in FIG. 1 (and as one or more query control blocks as indicated at 106 in FIG. 1). The query control blocks shown in FIG. 2 may be employed in relation to any and all job types as may be accommodated within a query. QCB1 (206a) can be employed for a new query, and/or to re-customize predicate logic and other information. QCB2 (206b) may be employed if a similar query job type is encompassed as in an immediately previous one. QCCB (206c) can be used for jobs with larger amounts of data. Each query block 206a/b/c contains all pertinent information related to receive input, predicate expression, and to output. Illustrative examples of such information are shown with respect to each query block 206a/b/c in FIG. 2.

Generally, in accordance with at least one embodiment of the invention, it can be appreciated that QCBs 206a/b/c act to deliver control information for FPGA predicate evaluation functions. By way of further details of an illustrative and non-restrictive example, the size of QCB1 206a can be 4 KB, includes several blocks 210a-220a as shown, and can be used when a FPGA needs to be re-tailored with a work description such as data page related information (via block 210a), predicate information (via block 212a), compression dictionary information (including DMA address; via block 216a), a list of DMA addresses of input data pages (via block 218a), and description and list of DMA addresses of an output buffer (via block 220a). Reduction control block 214a, for its part, can be logically structured as a tree for a reduction network (RN, to be discussed more fully herebelow), and contains the Boolean operations information among the simple predicates in a complex predicate expression.

In accordance with at least one embodiment of the invention, and by way of an illustrative and non-restrictive example, the size of QCB2 206b can be 4 KB, includes blocks 210b-220b as shown, and can be used when a FPGA does not need to be re-tailored with a query and does not need to reload a decompression dictionary. It thus does not contain information such as predicate information and dictionary's DMA address as QCB1 206a does. Thus, 206b includes a work description block 210b, a data list control block 218b and an output data control block 220b.

In accordance with at least one embodiment of the invention, and by way of an illustrative and non-restrictive example, QCCB 206c corresponds to "query control continuation block". It is used to extend the input data list for QCB1 206a or QCB2 206b. Hence, it only contains a work description piece (via block 210c as shown) and a list of DMA addresses for the input data page (via block 218c as shown). QCCB 206c, in the present example, is not used alone and instead follows QCB1 206a or QCB2 206b.

FIG. 3 schematically illustrates a manner of transforming a DBMS query to FPGA control information in accordance with at least one embodiment of the invention which can be handled, e.g. by component 104a in FIG. 1.

FIG. 4 schematically illustrates action taken by an FPGA control information interpreter 410, in accordance with at least one embodiment of the invention. It may be in an environment, e.g., as shown in FIG. 1 (and in the form of a control information interpreter as indicated at 109 in FIG. 1). The FPGA control information interpreter 410 can be employed in a manner now to be described. Included are customizable predicate evaluation engines (PE0-7, as shown) and a reduction network (including reduction units RU0-6, as shown). A sample structure of a predicate control element is indicated at 422. A predicate function block (such as the one indicated at 212a in FIG. 2) can hold one or more of such predicate control elements 422.

In accordance with at least one embodiment of the invention, for a new query, the QCB interpreter on the FPGA extracts the control blocks from a QCB1 (see 206a in FIG. 2) and configures the PEs and the RN. The FPGA "remembers" the previous query and no reload is required for a QCB2 (see 206b in FIG. 2). The QCB interpreter also extracts the pointers to input data and output buffers on the host CPU's memory. Input DMA logic on the FPGA fetches the data from the processor's memory, without requiring CPU intervention. Output DMA logic writes the results in the output buffers on processor memory.

FIG. 5 schematically sets forth a working example, in accordance with at least one embodiment of the invention. Mapping of the query is shown on the right. The predicates are shown mapped to various PE units which are connected to the reduction network in such a way as to implement the reduction of the predicates specified in the query. The binary tree implementation of the reduction network implements a fixed topology that as part of the DBMS transformation of the query requires that the DBMS map the predicates of the query in a way that given the topology satisfies the logical reduction of the query. This may require the grouping together of predicates that results in unused PE units.

By way of further elaboration, in accordance with at least one embodiment of the invention, and with reference to at least one illustrative and non-restrictive example, a database acceleration system is implemented on a PCIe-attached FPGA card and is integrated with a commercial database system. The FPGA operates on a DBMS' in-memory data and writes the results back into the host CPU's main memory. Data is transferred between the FPGA and the host using direct memory access (DMA) operations. Once the DBMS sends a job request to the FPGA, all the DMA operations are initiated by the FPGA without any intervention from the host CPU.

In accordance with at least one embodiment of the invention, two distinct pieces of logic implement an associated functionality. A service layer provides all of the logic that interfaces to the PCIe, DMA engines and job management logic. On the other hand, application logic implements just the functions required to process database queries on the FPGA. A set of well-defined interfaces exist between the two that include data buses for input and output data, queues for DMA requests, and control signals.

In accordance with at least one embodiment of the invention, on a host CPU, a job queue is maintained and the device driver and service layer logic cooperate to dispatch the jobs to the FPGA. Once a job has been dispatched, the service layer passes the job structures to the application logic and signals it to begin. From then on, the service layer only processes the DMA requests and updates the status of the jobs to the host. This structure allows the application logic to be developed independent of the service layer.

In accordance with at least one embodiment of the invention, to evaluate a query on the FPGA, each PE performs a specific operation on specific bytes of the database row, and the reduction network combines the outputs of the PEs in a given manner. The operation to perform and the fields to evaluate are specific to a given query and change with the query. As such, a row scanner can be configured such that a given hardware image can be tailored to a variety of different queries. To that end, each PE is designed to perform one of six inequality operations; the actual operation to be performed is chosen during the query load time. Moreover, some of the PEs can also be disabled and excluded from participating in the query. Similarly, the reduction network is constructed as a binary tree of reduction units. Each reduction unit is a 2 to 1 reducer capable of performing one of six 1-bit operations between the two inputs: AND, OR, NOT a, NOT b, PASS a, or PASS b.

In accordance with at least one embodiment of the invention, during the query load phase, the configuration options are propagated down the PE chain and the reduction tree. PEs are configured using 5 options: (i) enable, to indicate whether the current PE is being used, (ii) predicate value, the constant against which the row field is compared, (iii) the inequality operation to be performed, (iv) offset of the first byte of the desired field within the row and (v) length of the field. Reduction units involve an option related to the logical reduction operation to perform. During the scan phase, database rows are streamed over the PEs, one byte per cycle.

In accordance with at least one embodiment of the invention, it can be appreciated that enabling FPGA acceleration for a DBMS is an end-to-end effort. One aspect is to restructure the data flow. Secondly, the capability of transforming a DBMS query into a format that the FPGA accelerator can interpret for dynamic self-reconfiguration is also critical for accelerating various workloads without the need for recompiling or reloading acceleration function on FPGA. As such, a long running predicate evaluation query can be divided into multiple jobs for an FPGA to process sequentially. Each job thus involves a number of data pages as input for the FPGA to read, and an output buffer into which the FPGA writes the results. Both data transferring actions are initiated by the FPGA. For FPGA acceleration, a list of data pages (addresses) can be obtained by a data service layer in DBMS and read by the FPGA. For output data from the FPGA, the DBMS allocated buffer is filled by the FPGA engine with its results. The data format in this output buffer conforms to the structure that is understood by DBMS processing engine for further downstream processing so additional data copy and formatting software can be avoided.

In accordance with at least one embodiment of the invention, and as introduced heretofore, communication between the DBMS and the FPGA is achieved through a series of control blocks that are passed from the host to the FPGA. These carry the necessary information for describing the operations and data transfers. As such, a query may be broken up into multiple jobs. A job is submitted to the FPGA via a host control block (HCB), which encapsulates the job information but is independent of the application logic. The HCB is interpreted by the service layer in the FPGA; it carries information such as whether the current HCB is the last job in the queue, the DMA address of the query control block, as well as updatable fields indicating an active job's status. A queue of HCBs is maintained which allows more jobs to be queued while a job is active on the FPGA. FPGA will continue to the next job in the queue, if one is available, when the current one is completed.

In accordance with at least one embodiment of the invention, a QCB (as discussed heretofore) represents a data structure that is used to tailor the FPGA application logic to a specific query. By way of further elaboration, a QCB1 (e.g., as indicated at 206*a* in FIG. 2) can be used when the FPGA needs to interpret new query instructions and customize its internal logic. In accordance with an illustrative example, it contains predicate function information and an address list of the eight 4K dictionary pages to be loaded. When the format of a QCB2 (e.g., as indicated at 206*b* in FIG. 2) is used, the FPGA performs the same task as in the previous job on a different set of data. This saves the time needed to re-customize the FPGA logic and reload the dictionary. Further, to process more data pages per job than the limit imposed by a single QCB, a QCCB (e.g., as indicated at 206*c* in FIG. 2) enables more input pages to be chained to a job. The last entry in a QCB's data list points to the next QCCB when this is needed. As introduced heretofore, a QCB1 can contain a list of predicate function control blocks and a list of reduction control blocks.

Figure 6:
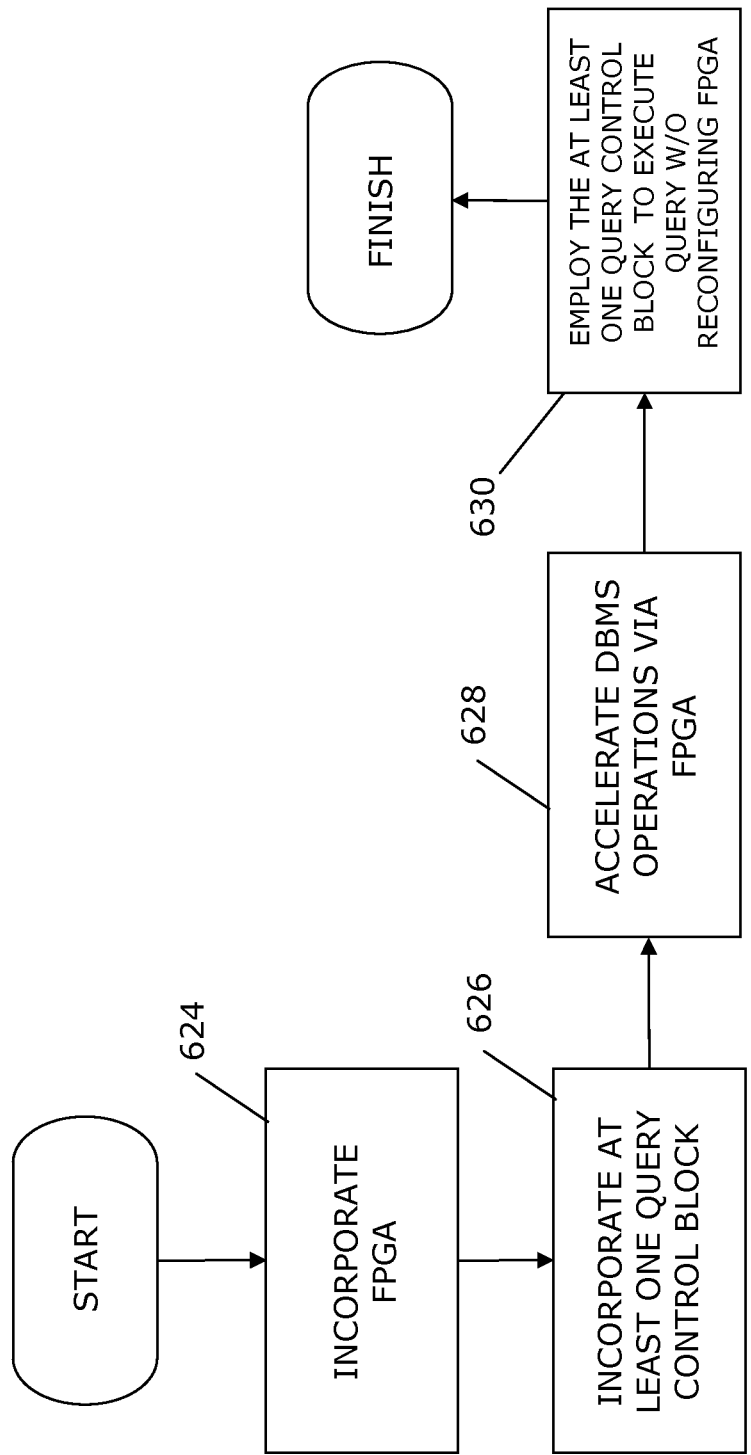
FIG. 6 sets forth a process more generally for facilitating accelerations of database functions.

FIG. 6 sets forth a process more generally for facilitating accelerations of database functions, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way of a processing unit or units and system memory such as those indicated, respectively, at 16' and 28' in FIG. 7.

As shown in FIG. 6, in accordance with at least one embodiment of the invention, a field programmable gate array is incorporated (624). At least one query control block is incorporated in the field programmable gate array (626), and database management system operations are accelerated via the field programmable gate array (628). The accelerating includes initial loading the bitstream into the FPGA and using at least one query control block to execute a query; further, the FPGA accelerator can be tailored to execute different queries without reconfiguring the field programmable gate array.

Figure 7:
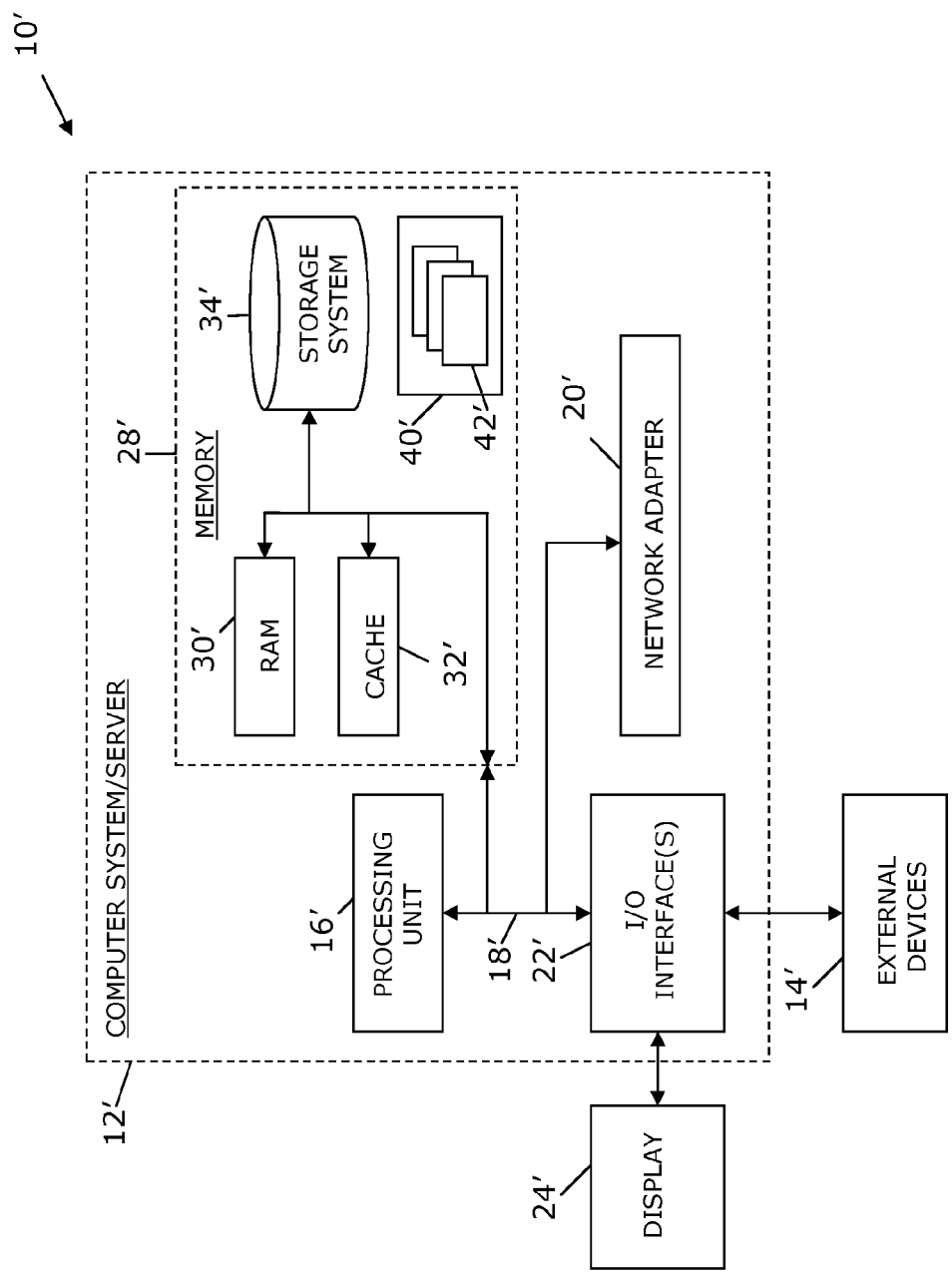
FIG. 7 illustrates a computer system.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   establishing communication with a field programmable gate array;
   dividing a query into multiple jobs for subsequent execution in the field programmable gate array;
   thereafter executing the query via sending a series of control blocks into the field programmable gate array, the series of control blocks comprising:
   a host control block sent for interpretation by a service layer in the field programmable gate array, wherein the host control block carries job information including status of an active job; and
   at least one query control block providing control information for at least one function of the field programmable gate array; and
   wherein the at least one query control block is configured to prompt execution of the query without reconfiguring application logic of the field programmable gate array.

2. The method according to claim 1, wherein at least one element of the at least one query control block is configured to describe at least one query requirement.

3. The method according to claim 1, wherein at least one element of the at least one query control block describes a data layout.

4. The method according to claim 1, wherein said executing comprises employing a transformation function which translates query control information into at least one control template of the at least one query control block.

5. The method according to claim 1, wherein the at least one query control block is configured to interact with field programmable gate array programming logic which interprets the at least one query control block.

6. The method according to claim 1, wherein:
   said executing comprises loading a bitstream into the field programmable gate array; and said method comprises executing another query without reloading the bitstream.

7. The method according to claim 1, wherein the at least one query control block comprises a query control block which accommodates a new query.

8. The method according to claim 1, wherein the at least one query control block comprises a query control block which recustomizes predicate logic via providing control information for a predicate evaluation function of the field programmable gate array.

9. The method according to claim 1, wherein the at least one query control block comprises a query control block which accommodates a query similar to a previous query.

10. The method according to claim 1, wherein at least one element of the at least one query control block describes the location of data and is configured to accommodate a query with a large amount of data via a chaining of data descriptor elements.

11. The method according to claim 6, wherein:
said executing of another query comprises sending at least one additional query control block into the field programmable gate array;
wherein the at least one additional query control block is configured based on the field programmable gate array referring to a previous query.

* * * * *